Oct. 27, 1953     J. STERN     2,656,757
RACKING MECHANISM FOR MICROPHOTOMETERS
Filed Jan. 16, 1951                                    4 Sheets-Sheet 1

FIG.I.

INVENTOR
JOSHUA STERN
BY
ATTORNEYS

Oct. 27, 1953        J. STERN        2,656,757

RACKING MECHANISM FOR MICROPHOTOMETERS

Filed Jan. 16, 1951        4 Sheets-Sheet 4

INVENTOR
JOSHUA STERN

BY

ATTORNEYS

Patented Oct. 27, 1953

2,656,757

UNITED STATES PATENT OFFICE 2,656,757

RACKING MECHANISM FOR MICRO-PHOTOMETERS

Joshua Stern, Mount Rainier, Md.

Application January 16, 1951, Serial No. 206,283

7 Claims. (Cl. 88—14)

(Granted under Title 35, U. S. Code (1952), sec. 266)

The invention described herein may be manufactured and used by or for the Government of the United States of America for governmental purposes without the payment of any royalties thereon or therefor.

The present invention relates to a microphotometer racking mechanism and more specifically to a mechanism which causes the photographic plate holder to advance automatically to the next successive row or series of spectral lines when the preceding row has been scanned and the density of the spectral lines measured.

It is well known that a microphotometer is an instrument for analyzing the densities of spectrum lines which have been recorded on a photographic plate. To accomplish this, the plate bearing the spectrum lines, of some substance under observation, is placed between a point source of light and a photocell so that the amount of light falling on the cell is dependent upon the densities of the spectrum lines. The conductivity of the photocell is then measured by a meter, or is recorded by some form of pen and ink recorder.

Under the old methods of operating this type of instrument, the photographic plate was manually racked or adjusted until the light spot was positioned on one row or series of spectrum lines which were then scanned and measured, followed by another manual racking of the plate to position the next line to be measured. This method has distinct disadvantages in that even though the scanning operation of each row is automatically halted due to the functioning of limit switches, it is still necessary that an operator be in constant attendance to rack the plate to the next successive row to be scanned. The scanning function itself may be performed automatically but the adjustment of the plate from row to row is not.

The mechanism of the present invention, and its method of operation, offer a number of advantages over the prior known methods in that they eliminate 90% of the time required of the operator. Using the invention, the operator sets the instrument for the first spectrum line in the first row and the instrument then, through its normal mode of operation, will read automatically up to approximately 35 rows of lines before requiring attention again. The device automatically shuts off and rings a warning bell after it has measured all of the lines. The operator, in the meantime, can be performing calculations using the previously measured values or may be performing any other duties.

Furthermore, another advantage offered by the invention is increased accuracy in the measurements due to elimination of the personal factor of the operator.

An object of the present invention is the provision of a microphotometer racking mechanism.

Another object is the provision of a racking mechanism for automatically advancing the photographic plate of a microphotometer to the next successive row of spectral lines after each row has been scanned.

Another object is the provision of an automatic racking mechanism which is operated by the limit switches after each scanning operation.

Yet another object is the provision of a racking mechanism which automatically reverses the scanner after each line is analyzed.

A final object is the provision of a microphotometer racking mechanism which shuts off the instrument and sounds an alarm when all of the spectral lines have been scanned.

Other objects and features of the invention will become apparent to those skilled in the art as the disclosure is made in the following detailed description of a preferred embodiment of the invention as illustrated in the accompanying sheets of drawings in which Fig. 1 shows a general view of a typical microphotometer with the racking mechanism of the present invention mounted thereon.

Figure 1:
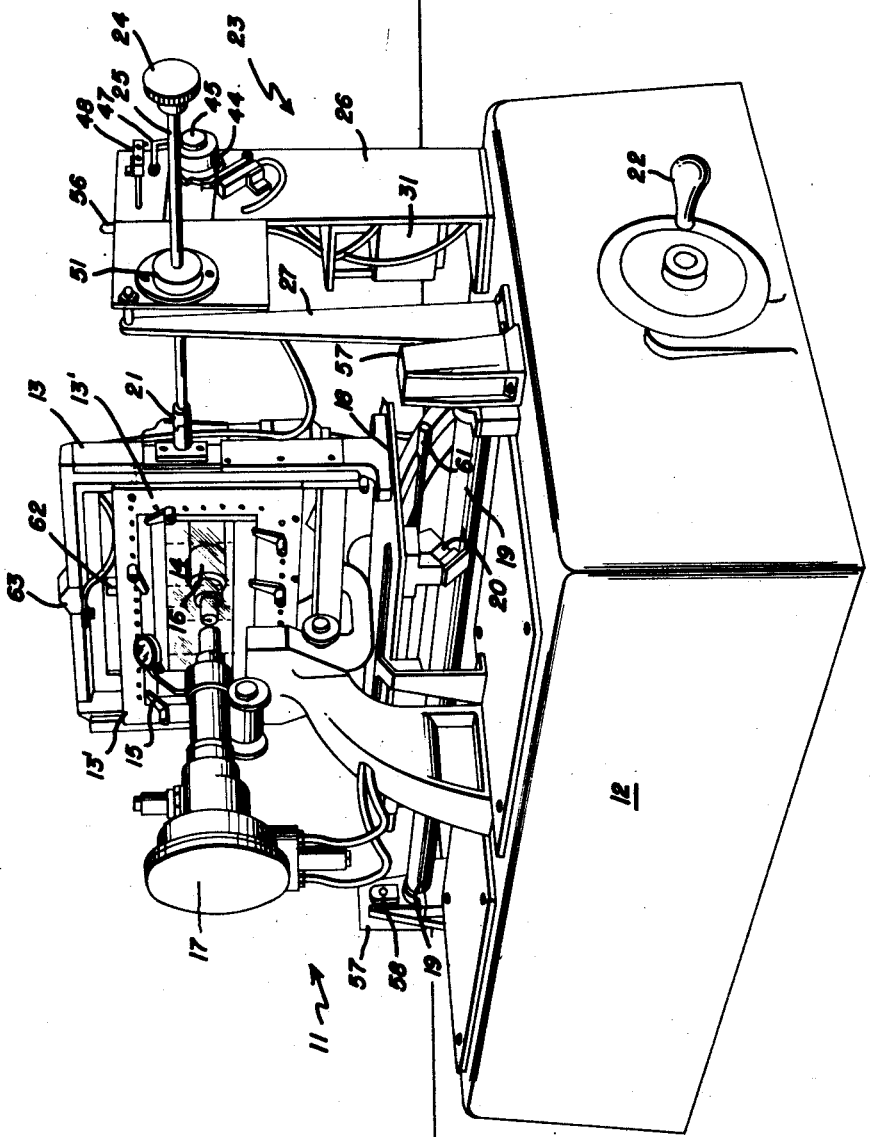

Referring now to the drawings wherein like reference characters designate like or corresponding parts throughout the several views, there is shown in Fig. 1 a typical microphotometer, indicated generally as 11, which may be of any well known embodiment. The microphotometer 11 consists, briefly, in a base member 12 which is utilized to house the scanning motor, amplifiers, and such, for the operation of the instrument, and it is to be noted that in the view of Fig. 1 the various control knobs and meters have been omitted from the flat, top portion of the base member 12 for the sake of simplicity.

Positioned above the base member 12 is a photographic plate rack 13 which has movably mounted therein a photographic plate holder 13' having mounted thereon a photographic plate 14 on which the spectrum lines are recorded, the plate 14 being held in position by means of spring clips 15. Rigidly mounted on base 12, by means of suitable supporting arms, is a light and lens arrangement 16 which projects a bright slit of light through the plate 14 and onto a photocell encased in the housing 17.

The spectrum lines recorded on plate 14 normally consist of a series of parallel lines, and often in making a complete analysis of a substance, there may be a number of rows of these parallel lines recorded on a single plate. In normal operation, a microphotometer will scan these parallel spectrum lines by causing the spot of light to move from one to the other, thereby measuring the density of the lines by the amount of light falling on the photocell. In order to properly scan the parallel lines, and the successive rows of them, it is necessary that the plate 14 be moved both horizontally and vertically with respect to the photocell and light source. The horizontal movement is accomplished through the expedient of making a carriage 18, on which the plate rack 13 is mounted, slidable upon a cylindrical track 19 through the use of suitable rollers 20, while the vertical movement is obtained from a rack and pinion arrangement, or the like (not shown), located in the vertical side pieces of plate rack 13, the rack and pinion being operated as through a universal joint 21 to move plate holder 13' up and down. It is to be noted that the horizontal, or scanning, movement of the plate holder 13' is obtained either automatically by means of a motor located within base 12 and a flexible tape connected to carriage 18, or manually by means of a hand wheel 22 (Fig. 1). On the other hand, the vertical, or racking, movement of plate 14 is obtained either automatically by means of the racking mechanism of the present invention and indicated generally as 23, or manually by means of knob 24, shaft 25 and universal joint 21.

Figure 2:
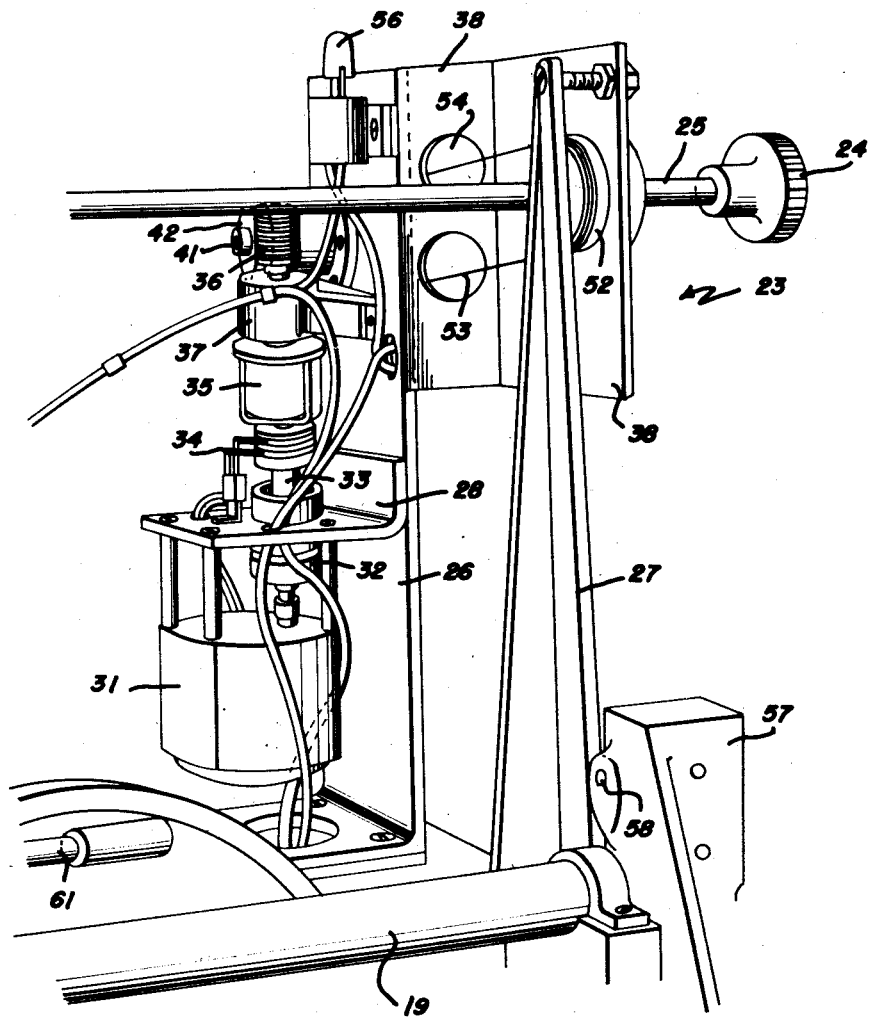
Fig. 2 shows an enlarged side view of the racking mechanism taken alone.

The automatic racking mechanism 23 of the present invention, which is clearly shown in the enlarged close-up view of Fig. 2, is mounted on the microphotometer base 12 by means of the vertically positioned supports 26 and 27. Fastened along the support 26, by means of a bracket 28, is a racking motor 31 which ultimately furnishes the power to rack or move the photographic plate 14 from one series of spectrum lines to the next. Motor 31 is joined by coupling 32 and shaft 33 to a slip-ring and brush arrangement 34 which is employed to energize a magnetic clutch 35, this in turn being used to drive a worm screw 36 which is mounted in a collar 37.

Figure 3:
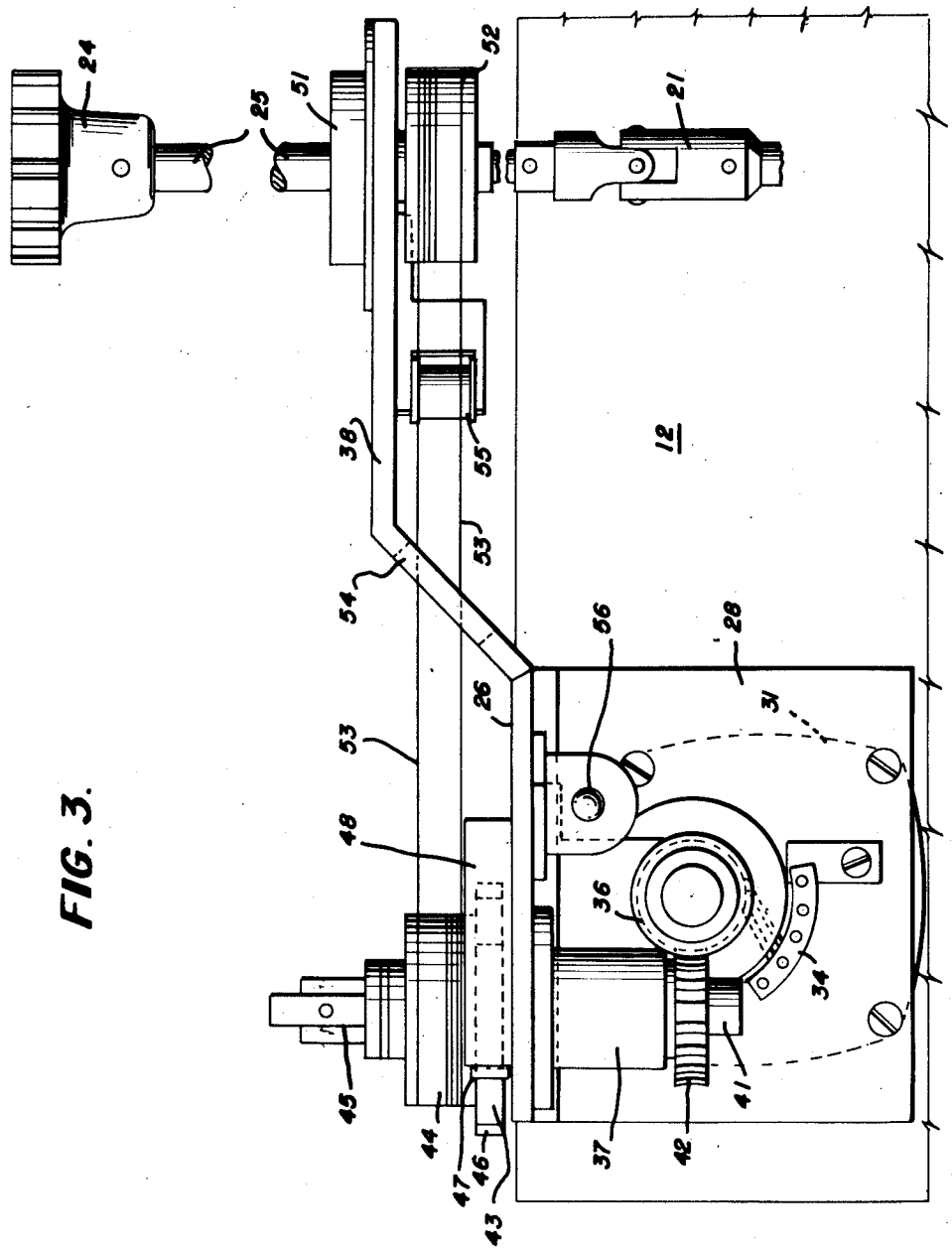
Fig. 3 shows a top view of the racking mechanism.
Figure 4:
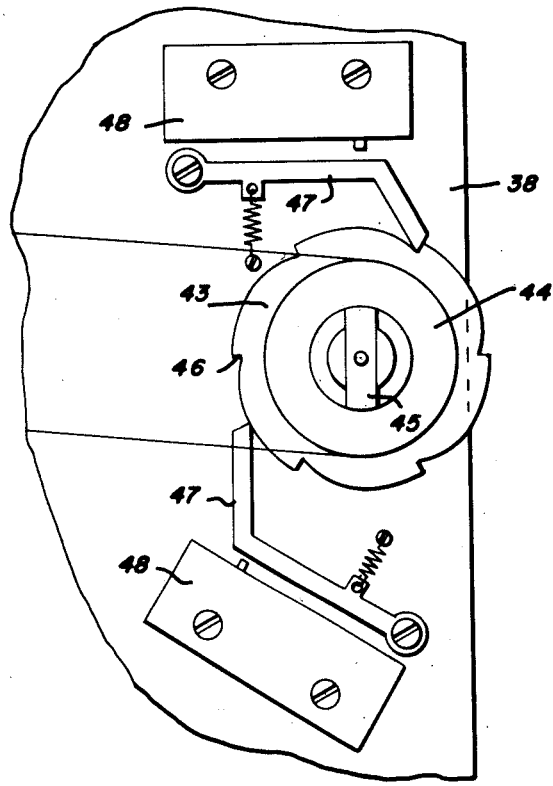
Fig. 4 is a fragmentary showing of the cam and microswitches which control the amount the plate holder advances.

Positioned transversely across the top of vertical supports 26 and 27 is a plate 38 having parallel offset portions, clearly seen in the top view of Fig. 3. At one end of plate 38 and passing through it and support 26 is a short shaft 41 which has attached at one of its ends a worm gear 42 so located that it meshes with worm screw 36 and is rotated thereby. Also integrally attached to shaft 41, and external of plate 38 is a cam 43, a steel drum 44 and a clutch 45; the clutch being in the extreme end of shaft 41 and operating to engage drum 44 and the shaft as will be more fully described hereinafter. As may be clearly seen in Fig. 4, the cam 43 has indented around its periphery a plurality of equally spaced notches 46 into which move the spring-urged, pivoted arms 47 so as to activate the microswitches 48.

Bolted to the opposite end of plate 38 from cam 43 and drum 44 is a ball bearing collar 51 through which is permitted to slide freely the shaft 25, while on the internal side of plate 38 is a second drum 52 through the center of which shaft 25 also slides. The drum 52 is arranged to rotate within collar 51 while at the same time, it is slidably keyed to shaft 25 whereby any rotation of the drum will rotate the shaft as well as let the shaft slide through it.

Figure 5:
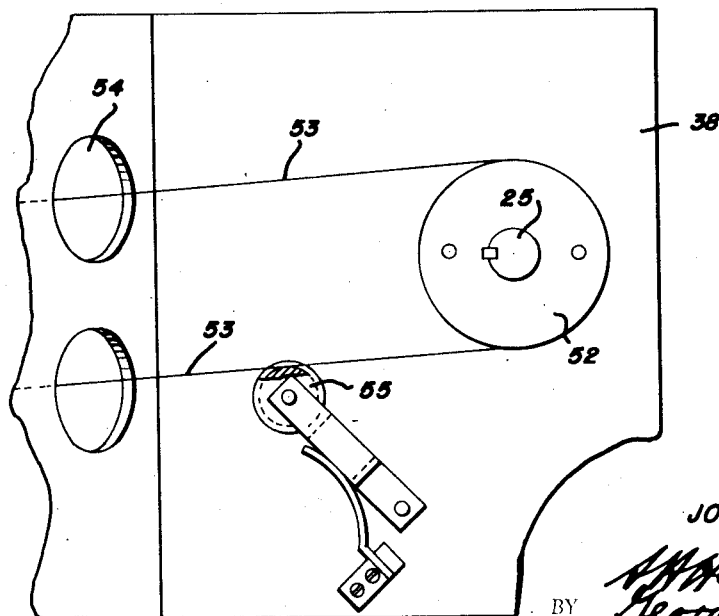
Fig. 5 is a fragmentary showing of a portion of the drive wire and the tension means therefor.

In order to transmit rotation from the motor 31 through drum 44 and thence through drum 52 to shaft 25, there is a steel wire 53 wound about the two drums and passing through the holes 54 in the offset portion of plate 38. A spring-urged idler pulley 55 (Fig. 5) is mounted on plate 38 to insure the proper tension on wire 53. It may be noted that the combination of a first drum 44, interconnecting wire 53, and second drum 52 serves a purpose other than to merely act as a drive mechanism in that it acts as part of the control mechanism to permit automatic operation. The combination enters into the control mechanism by permitting adjustment of the rate of racking to the rate of rotation of cam 43 which performs the automatic programming, this adjustment being accomplished by machining the diameter of drum 52 in manufacture as required.

Also mounted on plate 38 is an electrical starting switch 56 whose operation will be more fully described hereinafter.

Returning now to the view of Fig. 1, there can be seen at either end of the microphotometer base 12 a short abutment 57 having set into it a switch contact 58 (Fig. 2) which cooperates with a rod 61 protruding from either end of the carriage 18 for plate rack 13. The length of the rod 61 is adjustable within certain limits by extending the enlarged end of the rod whereby as the carriage 18 moves back and forth along track 19, during the scanning operation, the rods 61 approach one or the other of the abutments 57. When the rod gets close enough to operate switch contact 58, the scanning motor is shut off whereby the elements 58 and 61 effectively function as limit switches.

Just as there is a limit switch for the scanning operation, there is also one for the racking operation, and it can be seen in the view of Fig. 1 that on the topmost edge of the plate holder 13', there is a protuberance or button 62, while on the underside of the top edge of plate rack 13, there is a microswitch 63. These two elements cooperate to stop the automatic racking mechanism when all rows of the spectrum lines have been successively scanned.

In operation, the automatic racking mechanism of the present invention functions as follows. Assume first that the photographic plate 14, on which are recorded a number of rows of spectrum lines obtained from the substance under analysis, has been placed within the plate holder 13' and under the spring clips 15. Then the knob 24 is manually turned to rotate shaft 25 and universal joint 21 so that plate holder 13' moves vertically within plate rack 13 until the light spot from lens 16 falls upon the topmost row of spectrum lines on plate 14. Next the hand wheel 22 is rotated to move carriage 18, and therefore rack 13, horizontally along track 19 to thereby position the light spot so that it falls upon the endmost spectrum line in the top row. Meanwhile, the microphotometer has been turned on and its power supply, amplifier, photocell, and such, allowed to come up to their maximum operating temperature according to accepted practice.

Now the automatic racking mechanism 23 is ready to be energized and the spectrum line densities recorded. The clutch 45 is engaged to thereby make drum 44 integral with shaft 41, the drum having been released from the shaft and free to turn thereon so as to facilitate the manual adjustments. After the clutch is engaged, the pushbutton switch 56 is pressed which puts the automatic racking mechanism into operation by energizing a relay switch within base 12, and not shown, which makes the electrical connection involved in converting from manual to automatic operation. The scanning motor within base 12 then moves the carriage 18 along track 19 so that the spectrum lines of the first row successively pass between the light and the photocell. This scanning operation continues until the end of rod 61 actuates one of the limit switches 58, the action of which energizes the racking motor 31 and magnetic clutch 35. Motor 31 rotates driving worm screw 36, worm gear 42, and drum 44 which, in turn, by means of steel wire 53, rotates drum 52, shaft 25 and universal joint 21, thereby raising plate holder 13' and plate 14 vertically until the next row of lines is before the scanning lens.

As shaft 41 rotates due to the energization of motor 31, it also causes cam 43 to rotate and this continues until the motor and magnetic clutch are de-energized by the interaction of cam 43 and microswitches 48 when one of the pivoted arms 47 enters one of the notches 46. It is to be noted that the notches 46 are so arranged and the microswitches so placed around the cam, that the motor and magnetic clutch are de-energized just at the point where the plate 14 has been racked up to the next succeeding row of spectrum lines.

In addition to racking the photographic plate up a row at a time, the interaction of the cam and the microswitches also act to start the scanning motor of the microphotometer in the reverse direction so that the next line which has just been racked into the proper position for reading is now scanned. This scanning continues until the other limit switch is activated by the other rod 61 and the cycle repeats.

The racking operation continues, row by row, until the plate holder 13' has been sufficiently raised so that button 62 activates limit switch 63 to sound a warning bell, put the instrument into stand-by condition and automatically return it to manual operation.

In examining a plate with a number of rows of spectrum lines thereon, the operator of the machine is often desirous of taking readings over only a limited portion of the spectrum, and frequently this portion may be limited to a narrow band of frequencies of only a few angstroms. In such a situation, the limit switch actuating rods 61 are extended so that they close switches 58 after carriage 18 has moved only a short distance in either direction during the scanning operation. Each time a switch 58 is closed, the racking mechanism is energized, as before, to rack plate holder 13' to the next row of lines. The result of these adjustments is that once the spot of light is positioned on the desired area, the racking mechanism causes the light to move in almost a straight vertical line across the photographic plate. The racking procedure is substantially continuous, thereby saving considerable time which would be spent in scanning a complete row before the next one is moved into position before the light.

It is obvious from the above description of the structure and operation of the present invention that it offers a number of improvements over similar devices in the prior art. The invention provides an automatic racking mechanism for a microphotometer so that the rows of lines to be analyzed are racked row by row before the scanning lens without the attendance of an operator, thereby releasing him for other duties. The device will provide increased accuracy in its measurements due to elimination of the human factor of an operator and will scan up to approximately 35 rows of spectral lines before needing added attention. Furthermore, the device will sound an alarm and shut off the microphotometer when all of the lines have been scanned.

It should be understood, of course, that the foregoing disclosure relates to only a preferred embodiment of the invention and that it is intended to cover all changes and modifications of the example of the invention herein chosen for the purposes of disclosure, which do not constitute departures from the spirit and scope of the invention as set forth in the appended claims.

Having thus described the invention, what is claimed is:

1. A microphotometer racking mechanism for advancing a photographic plate holder with respect to the scanning mechanism comprising a motor, a first drum, a cam integral with the first drum, means connected to said motor for rotating the first drum and the cam, switch means cooperating with said cam to limit its degree of rotation a predetermined amount depending upon the contour of the cam, a second drum, flexible means connecting said drums, and means connecting the second drum and the plate holder.

2. In combination, means for mounting a photographic plate having spectrum lines recorded thereon before the scanner of a microphotometer, a motor magnetically coupled to rotate a first drum, a cam integral with the drum and rotating therewith, switch means associated with the cam and activated thereby, a second drum flexibly coupled with the first drum to rotate therewith, and rotatable means connecting the second drum and the plate mounting whereby the operation of said motor repositions the plate before the scanner.

3. The combination of claim 2 wherein the motor is energized when each row of spectrum lines has been scanned.

4. The combination of claim 2 wherein the motor is energized when each row of spectrum lines has been scanned, and wherein said switch means acts to initiate the scanner in the reverse direction.

5. In combination, means for mounting a photographic plate having a plurality of rows of spectrum lines recorded thereon before the scanner of a microphotometer, motor means magnetically connected to said mounting to adjust same, said motor means acting to automatically position successive rows of spectrum lines before the scanner, said motor means including a cam and switches operated by the cam, whereby the motor is energized after each row of spectrum lines is scanned and the switches initiate the scanning of the next row.

6. The combination of claim 5 including another switch attached to said plate mounting means whereby said other switch is activated to shut off the device when all of the spectrum lines have been scanned.

7. A microphotometer racking mechanism for automatically positioning a photographic plate so that successive rows of spectrum lines recorded on the plate appear before the scanner comprising a motor to be energized after each row is scanned, a drum, magnetic coupling between the motor and the drum, a cam integral with the drum, switch means cooperating with the cam to limit the degree of rotation of the drum a predetermined amount depending upon the contour of the cam, another drum flexibly connected to the first drum to rotate therewith, a rotatable shaft connecting the other drum with a mounting for said plate, and a limit switch activated by said mounting, whereby the motor advances the plate to the next successive row of spectrum lines until the limit switch is closed.

JOSHUA STERN.

References Cited in the file of this patent

FOREIGN PATENTS

| Number | Country | Date |
|---|---|---|
| 86,250 | Sweden | May 5, 1936 |
| 232,664 | Switzerland | June 15, 1944 |